May 23, 1961   F. G. REUTER   2,984,963
CUTTER BLADE GUIDE MEANS
Filed Dec. 27, 1957

INVENTOR:
Franz Gottfried Reuter

By Clell W. Upchurch
ATTORNEY.

United States Patent Office 2,984,963
Patented May 23, 1961

2,984,963

CUTTER BLADE GUIDE MEANS

Franz G. Reuter, Lemforde, Hannover, Germany, assignor, by mesne assignments, to Mobay Chemical Company, Pittsburgh, Pa., a corporation of Delaware Filed Dec. 27, 1957, Ser. No. 705,655

Claims priority, application Germany Jan. 8, 1957

1 Claim. (Cl. 56—305)

This invention relates generally to harvesting machines and, more particularly, to a novel guide for the reciprocating blade of the cutter-bar of a harvesting machine.

The cutter blade guide of the heretofore available harvesters is made of steel and becomes worn as the blade reciprocates. Moreover, the heretofore available cutter-bar and guide assembly require excessive power to overcome the friction between the steel cutter blade and the steel guide.

It is therefore an object of this invention to provide an improved guide or blade holder for the reciprocating blade of the cuter-bar of a harvesting machine. Another object of the invention is to provide a novel guide and cutter-bar assembly. A still further object of the invention is to provide a holder or guide for the reciprocating blade of a cutter-bar of a harvesting machine which is adapted to withstand abrasion by the cutter blade. A more specific object of the invention is to provide an improved holder or guide for the reciprocating blade of a harvesting machine which is self-lubricating and has an increased service life under the conditions encountered by farm machinery.

Figure 1:
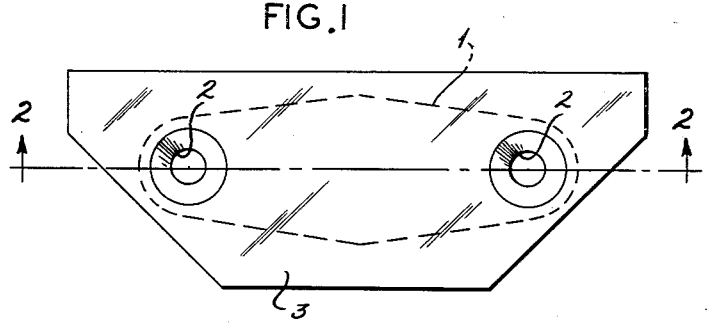
Figure 2:
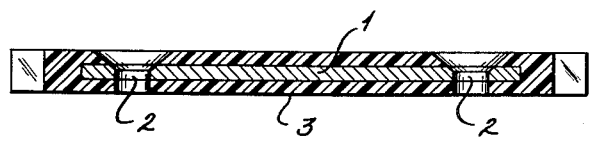

Other objects will become apparent from the following description with reference to the accompanying drawing, in which Figure 1 is a top view of an embodiment of the invention; and Figure 2 is a cross section taken along the line 2—2 in Figure 1.

Generally speaking, the foregoing objects and others are accomplished in accordance with this invention by providing a holder or guide for the reciprocating blade of the cutter-bar of a harvester having a substantially non-porous rubber-like polyurethane surface exposed to the cutter blade. More specifically, the invention provides a holder or guide for the reciprocating blade of a cutter-bar of a harvester shaped from steel and substantially completely enclosed in a substantially non-porous rubber-like polyurethane plastic. The substantially non-porous rubber-like polyurethane plastic should have a resiliency of from about 25% to about 40% and a Shore A hardness of from about 75° to about 95° for best results.

A preferred embodiment of the invention has a generally elliptically shaped steel member completely enclosed in a film of substantially non-porous rubber-like polyurethane plastic. Suitable bolt holes are provided for fastening the guide to the harvester. The steel insert may be coated with the polyurethane plastic by an suitable process, but it has been found particularly advantageous to cast the polyurethane about the steel member.

The substantially non-porous rubber-like plastic may be prepared by any suitable known method, such as, for example, one of the methods disclosed in U.S. Patents 2,620,516, 2,729,618 or 2,764,565. The polyurethane may be prepared by reacting an organic compound having reactive hydrogens and a molecular weight of at least about 500, such as, for example, a polyester, a polyesteramide, a polyalkylene ether glycol or a polythioether with an excess of an organic polyisocyanate and a cross-linking agent. The polyester may be prepared by esterification of adipic acid or other suitable polycarboxylic acid with a polyhydric alcohol. The polyalkylene ether glycol may be prepared by condensation of ethylene oxide, propylene oxide, butylene oxide, or other suitable alkylene oxide. The polythioether may be prepared by condensing a suitable thioglycol, such as, thiodiglycol, or by condensing a thioglycol with one of the alkylene oxides. Preferably, the hydroxyl number of such compounds is not more than about 224. The acid number of the polyester should be, preferably, 0 to about 2.

Any suitable organic polyisocyanate, including those disclosed in the aforesaid patents, may be used in preparing the polyurethane. Examples of such polyisocyanates include 1,5-naphthylene diisocyanate, p-phenylene diisocyanate and 4,4'-diphenyl dimethyl methane diisocyanate. Any of the suitable cross-linking agents disclosed in the aforesaid patents may be used, including ethylene glycol, diethylene glycol, or a suitable diamine.

It is preferred to include molybdenum disulfide, a silicone oil or a hydrocarbon in the polyurethane. This material may be added to the polyurethane while mixed with one of the components which are reacted together to form the polyurethane or it may be added after the reaction and before solidification of the polyurethane. Preferably, the molybdenum disulfide and other additives are added to the polyester or other organic compound having reactive hydrogen atoms before the compound is reacted with the organic polyisocyanate. The polyurethane containing the molybdenum disulfide, silicone oil and/or hydrocarbon is rubber-like and withstands friction better than a similar polyurethane not containing these materials.

It is most advantageous to use a substantially chemically pure molybdenum disulfide. The product disclosed in U.S. Patents 2,367,946 and 2,686,156 has been found admirably suited for the purpose. At least about 0.01 percent and not more than about 5 percent or more molybdenum disulfide may be used. Preferably, from about 0.1 percent to about 1 percent, molybdenum disulfide, based on the weight of the cured rubber-like polyurethane, is used. It is preferred that the molybdenum disulfide have a particle size within the range of from about 0.002 to about 2 millimeters in cross-sectional dimension. A molybdenum disulfide powder having a particle size of from about 0.002 to about 0.02 millimeters in cross section has been found particularly desirable.

The total amount of silicone oil and hydrocarbon added to the polyurethane plastic will preefrably be within the range of from about 0.01 percent to about 5 percent by weight of the plastic. The silicone oil may be any suitable liquid organo-polysiloxane having a viscosity of from about 50 to about 500 centistokes at 20° C. For example, dimethyl siloxane polymers having a viscosity of about 50 centistokes at 20° C., dimethyl siloxane polymers having a viscosity of about 140 centistokes at 20° C. and dimethyl siloxane polymers having a viscosity of about 440 centistokes at about 20° C. have been found particularly well suited for the purpose.

Any suitable hydrocarbon may be used alone or in admixture with the silicone oil in combination with the molybdenum disulfide. High boiling petroleum fractions, such as kerosene and conventional lubricating oils, or solid paraffins, including paraffin wax, montan wax and the like, may also be used.

Referring now to the drawing, one embodiment of the invention is illustrated in Figure 1. This embodiment has a light gauge sheet metal insert 1 having the general modified elliptical shape of a scale beam. Insert 1 is provided with bores 2 adapted to receive a suitable rivet or bolt when assembling the guide with the remainder of the harvester. Insert 1 is completely enclosed in a substantially non-porous rubber-like polyurethane plastic 3 as shown to the best advantage in the cross-sectional view of Figure 2. Polyurethane plastic 3 was cast about the steel insert and has a resiliency of about 30% and a Shore A hardness of about 95°. The polyurethane contains about 0.5 percent by weight molybdenum disulfide and about 1.5 percent by weight silicone oil. The guide is therefore self-lubricating and the cutter blade can be operated in the absence of other lubrication for a long period of time without serious damage to the blade or cutter.

It is to be understood that polyurethane plastics having other hardnesses and resiliencies and containing other amounts of molybdenum disulfide, silicone oil and/or hydrocarbons falling within the ranges specified hereinbefore may be substituted for the polyurethane plastic 3 above. Although the particular shape shown in the drawing has many advantages and is preferred, the shape can be modified, to some extent, by those skilled in the art.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claim.

What is claimed is:

In a harvesting machine having a reciprocating cutter-bar and a blade guide means slidably engaging said cutter-bar the improvement in the blade guide means which comprises a plate of polyurethane plastic having a Shore A hardness of from about 75° to about 95°, a resiliency of from about 25 percent to about 40 percent and containing from about .01 percent to about 5 percent of molybdenum disulfide and from about .01 percent to about 5 percent of a member selected from the group consisting of a silicone oil and a hydrocarbon, said plate of polyurethane engaging said cutter-bar and having an insert of a metallic material having an area substantially equal to the area of said plate of polyurethane plastic, said plastic plate and said metallic insert having aligned apertures therethrough for connecting said blade guide means to said machine.

References Cited in the file of this patent

UNITED STATES PATENTS

| | | |
|---|---|---|
| 777,093 | Hartman | Dec. 13, 1904 |
| 2,622,949 | Cotchett | Dec. 23, 1952 |
| 2,686,155 | Willis et al. | Aug. 10, 1954 |
| 2,686,156 | Arntzen et al. | Aug. 10, 1954 |
| 2,703,768 | Hall | Mar. 8, 1955 |
| 2,705,691 | Panagrossi et al. | Apr. 5, 1955 |
| 2,720,119 | Sherman | Oct. 11, 1955 |
| 2,764,565 | Hoppe et al. | Sept. 25, 1956 |
| 2,798,005 | Love | July 2, 1957 |
| 2,815,253 | Spriggs | Dec. 3, 1957 |

OTHER REFERENCES

Publication: "Product Engineering," Nov. 10, 1958 (page 117).